(12) United States Patent
Prout

(10) Patent No.: US 8,602,187 B2
(45) Date of Patent: Dec. 10, 2013

(54) OVERRUNNING ONE-WAY CLUTCH OR COUPLING ASSEMBLY

(75) Inventor: Jeffrey J. Prout, Freeland, MI (US)

(73) Assignee: Means Industries, Inc., Saginaw, MI (US)

( * ) Notice: Subject to any disclaimer, the term of this patent is extended or adjusted under 35 U.S.C. 154(b) by 686 days.

(21) Appl. No.: 12/706,161

(22) Filed: Feb. 16, 2010

(65) Prior Publication Data

US 2010/0230226 A1 Sep. 16, 2010

Related U.S. Application Data

(60) Provisional application No. 61/159,982, filed on Mar. 13, 2009.

(51) Int. Cl.
*F16D 41/16* (2006.01)

(52) U.S. Cl.
USPC ............................ 192/43.1; 192/69.1; 192/47

(58) Field of Classification Search
USPC .................... 192/43.1, 46, 47, 69.1
See application file for complete search history.

(56) References Cited

U.S. PATENT DOCUMENTS

| | | | |
|---|---|---|---|
| 5,927,455 A | 7/1999 | Baker et al. | |
| 6,193,038 B1 * | 2/2001 | Scott et al. | 192/46 |
| 6,244,965 B1 * | 6/2001 | Klecker et al. | 464/81 |
| 6,290,044 B1 * | 9/2001 | Burgman et al. | 192/46 |
| 6,571,926 B2 * | 6/2003 | Pawley | 192/45.1 |
| 6,814,201 B2 * | 11/2004 | Thomas | 192/43.1 |
| 7,198,587 B2 | 4/2007 | Samie et al. | |
| 7,258,214 B2 | 8/2007 | Pawley et al. | |
| 7,275,628 B2 | 10/2007 | Pawley et al. | |
| 7,344,010 B2 * | 3/2008 | Fetting et al. | 192/43.1 |
| 7,464,801 B2 | 12/2008 | Wittkopp | |
| 7,484,605 B2 | 2/2009 | Pawley et al. | |
| 8,051,959 B2 * | 11/2011 | Eisengruber | 188/82.3 |
| 8,079,453 B2 * | 12/2011 | Kimes | 192/43.1 |
| 2004/0159517 A1 * | 8/2004 | Thomas | 192/39 |
| 2007/0056825 A1 * | 3/2007 | Fetting et al. | 192/43.1 |
| 2007/0278061 A1 | 12/2007 | Wittkopp et al. | |
| 2008/0110715 A1 | 5/2008 | Pawley | |
| 2008/0169166 A1 | 7/2008 | Wittkopp et al. | |
| 2008/0185253 A1 | 8/2008 | Kimes | |
| 2008/0223681 A1 | 9/2008 | Stevenson et al. | |
| 2009/0159391 A1 * | 6/2009 | Eisengruber | 192/48.7 |
| 2009/0211863 A1 * | 8/2009 | Kimes | 192/43.1 |
| 2010/0181157 A1 * | 7/2010 | Smetana | 192/46 |
| 2010/0230226 A1 * | 9/2010 | Prout | 192/43.1 |
| 2010/0252384 A1 * | 10/2010 | Eisengruber | 192/35 |
| 2012/0145506 A1 * | 6/2012 | Samie et al. | 192/46 |

OTHER PUBLICATIONS

International Search Report and Written Opinion, International Application No. PCT/US2010/026035; mailed May 5, 2010.
Extended European Search Report; European application No. EP 10 75 1193 corresponding to International application No. PCT/US2010026035; date of search Oct. 4, 2012.

\* cited by examiner

*Primary Examiner* — David D Le
*Assistant Examiner* — Steven B Christ
(74) *Attorney, Agent, or Firm* — Brooks Kushman P.C.

(57) ABSTRACT

An overrunning one-way clutch or coupling assembly includes a first outer coupling member and an inner coupling member which together have a first pair of annular coupling faces therebetween and a second outer coupling member which together with the inner coupling member have a second pair of annular coupling faces therebetween. Both pairs of coupling faces are formed with sets of pockets and locking formations. Forward and reverse sets of struts are located in pockets axially spaced apart from each other.

11 Claims, 3 Drawing Sheets

OVERRUNNING ONE-WAY CLUTCH OR COUPLING ASSEMBLY

CROSS-REFERENCE TO RELATED APPLICATIONS

This application claims the benefit of U.S. provisional application entitled "Co-Planar One-Way Clutch (OWC) Or Coupling Assembly" filed Mar. 13, 2009 and having U.S. Ser. No. 61/159,982.

BACKGROUND OF THE INVENTION

1. Field of the Invention

This invention relates to overrunning one-way clutches or coupling assemblies especially for use in vehicular automatic transmissions.

2. Background Art

A typical one-way clutch consists of an inner ring, an outer ring and a locking device between the two rings. The one-way clutch is designed to lock in one direction and to allow free rotation in the other direction. Two types of one-way clutches often used in vehicular, automatic transmissions include:

Roller type which consists of spring loaded rollers between the inner and outer race of the one-way clutch. (Roller type is also used without springs on some applications); and Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

U.S. Pat. No. 5,927,455 discloses a bi-directional overrunning pawl-type clutch having a driving member mounted for power rotation, a driven member mounted for rotation adjacent the driving member, with each of the driving and driven members having pawl engaging shoulders, and a plurality of rigid pawls interposed between the driving and driven members. A control element is mounted for shifting movement between the driving and driven members to control the position of the pawls which are yieldably biased toward positions of engagement extending between the driving and driven members to produce driving engagement therebetween. The control element is shiftable to various positions to permit driving and overrunning in one direction or driving and overrunning in the opposite direction dependent upon the direction of rotation of the driving member.

U.S. Pat. No. 6,244,965 discloses a planar overrunning coupling for transfer of torque from a driving member to a driven member in one direction and which permits freewheeling motion between the members upon a torque reversal. The coupling includes coupling plates situated in close proximity with a strut retainer plate disposed between them, one plate being connected to the driving member and the other plate being connected to the driven member, each plate having strut recesses, a series of struts located in the recesses of one plate so that each strut may be pivoted, thereby allowing the struts to engage the companion recesses in the other coupling plate. The retainer has angularly spaced apertures that register with the struts to permit pivotal movement of the struts when the retainer plate is in one rotary position. The retainer plate, when it is in a second rotary position, prevents pivotal motion of the struts, thereby permitting freewheeling relative motion of the coupling plates.

U.S. Pat. No. 6,290,044 discloses a selectable one-way clutch assembly for use in an automatic transmission comprising a strut plate rotatable about a central hub and having pockets and struts mounted therein for pivotable rotation. A selecting plate concentrically located about an activator hub has teeth extending axially inboard and configured to fit in the apertures in an activator plate. A turning device is selectively operable to activate one-way clutching mode by rotating the pin of a control plate to disengage selecting cams and displace selecting plate teeth inboard beyond the inboard face of the activator plate wherein the struts catch the teeth when the strut plate assembly is rotated in a clutching direction. The catching ends of the struts are cammed in the pockets by ramped camming ends of the teeth when the strut plate assembly is rotated in the opposing direction, thereby allowing freewheeling of the strut plate in the overrun direction.

U.S. Pat. No. 7,258,214 discloses an overrunning coupling assembly and a method of controlling the engagement of planar first and second members wherein two sets of opposed engaging struts are applied with one motion of a single control plate or member. The planar first and second members have inside surfaces extending generally normal to a first axis. The assembly includes free-floating, forward keys and free-floating, reverse keys opposed to the forward keys. The forward and reverse keys are movable between a notch-engaging, engaged position and a disengaged position in which the second member is permitted to free-wheel relative to the first member. The planar control member is disposed between the first and second surfaces and is controllably rotatable about the first axis between first and second angular positions relative to the first member.

U.S. Pat. No. 7,344,010 discloses an overrunning coupling assembly and a method of controlling the engagement of planar first and second members wherein the assembly includes clustered pawls and their respective pawl-holding portions. The planar first and second members have inside surfaces extending generally normal to a first axis. The pawls include a forward set of free-floating pawls and a reverse set of free-floating, clustered pawls. The forward and reverse sets of pawls are movable between a notch-engaging, engaged position and a disengaged position. Because of the clustering, a control element, disposed between the first and second surfaces, need not be fully circular and is controllably rotatable about the first axis between first and second angular positions relative to the first member.

U.S. Pat. No. 7,484,605 discloses an overrunning radial coupling assembly or clutch and a method of controlling the engagement of inner and outer plates or members of the assembly wherein adjacent engaging radial locking pawls are selectively controlled by a single, rotatable control plate or element to obtain full lock, one-way lock and one-way overrun conditions. The assembly includes free-floating, forward pawls and free-floating, reverse pawls adjacent to their respective forward pawls. The forward and reverse pawls are movable between a notch-engaging, engaged position (i.e., full lock condition) and a disengaged position in which the outer member is permitted to free-wheel relative to the inner member in the one-way overrun condition in one direction about a first axis and the outer member is locked to the inner member in the one-way lock condition in the opposite direction. A number of different embodiments of the assembly and method are provided.

Other related U.S. patent publications include: U.S. 2009/0211863; 2009/0159391; 2008/0223681; 2008/0110715; 2008/0169166; 2008/0185253; and 2007/0278061 and the following U.S. Pat. Nos. 7,464,801; 7,275,628; 7,198,587; and 6,193,038.

When forward and reverse struts are located at a single interface between pocket and notch plates a relatively large quantity of lubricating fluid or oil may be required to dampen the forward struts during overrun.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF THE INVENTION

An object of at least one embodiment of the invention is to provide an improved one-way clutch or coupling assembly.

In carrying out the above object and other objects of at least one embodiment of the present invention, a controllable coupling assembly is provided. The assembly includes first and second outer coupling members and an inner coupling member supported between the outer coupling members for rotation relative to the outer coupling members about a common rotational axis. The first outer and inner coupling members have a first pair of annular coupling faces that oppose each other and are oriented to face axially along the rotational axis. The second outer and the inner coupling members having a second pair of annular coupling faces that oppose each other and are oriented to face axially along the rotational axis. A first coupling face of the first pair which has a first set of pockets spaced about the rotational axis. Each pocket of the first set has a pivotal reverse strut received thereby. A first coupling face of the second pair has a second set of pockets spaced about the rotational axis. Each pocket of the second set has a pivotal forward strut received thereby. A second coupling face of the second pair has a first set of locking formations that are engaged by the forward struts upon projecting outwardly from the second set of pockets to prevent relative rotation of the second outer and inner coupling members with respect to each other in a first direction about the axis while permitting relative rotation of the second outer and inner coupling members with respect to each other in an opposite second direction about the axis by pivoting of the forward struts in the second set of pockets. A second coupling face of the first pair has a second set of locking formations that are engaged by the reverse struts upon projecting outwardly from the first set of pockets to prevent relative rotation of the first outer and inner coupling members with respect to each other in the second direction about the axis while permitting relative rotation of the first outer and inner coupling members with respect to each other in the first direction about the axis by pivoting of the reverse struts in the first set of pockets. The assembly also includes a control member mounted for controlled, shifting movement between the first pair of coupling faces relative to the first set of pockets and operable for controlling position of the reverse struts. The control member allows at least one of the reverse struts to engage at least one of the second set of locking formations in a first position of the control member. The control member maintains the reverse struts in their pockets in a second position of the control member.

The first outer coupling member may include a housing having an end wall.

The inner coupling member may include a splined ring having a pair of spaced, radially extending surfaces. A first one of the radially extending surfaces may be formed with the second set of pockets.

The control member may include a slide plate controllably rotatable about the rotational axis between the first and second positions.

The assembly may further include a control element coupled to the control member and extending through a notch formed through the end wall to controllably shift the control member.

The first set of locking formations may include cams.

One of the outer coupling members may have an annular groove. The assembly may further include a generally round snap ring that is received by the annular groove in the one outer coupling member to retain the outer members and the inner member together and prevent axial movement of the outer members and the inner member relative to one another.

The second set of locking formations may include ramped reverse notches.

A second one of the radially extending surfaces may be formed with the second set of locking formations.

Further in carrying out the above object and other objects of at least one embodiment of the present invention, a controllable clutch is provided. The clutch includes first and second outer clutch members and an inner clutch member supported between the outer clutch members for rotation relative to the outer clutch members about a common rotational axis. The first outer and inner clutch members have a first pair of annular coupling faces that oppose each other and are oriented to face axially along the rotational axis. The second outer and inner clutch members have a second pair of annular coupling faces that oppose each other and are oriented to face axially along the rotational axis. A first coupling face of the first pair has a first set of pockets spaced about the rotational axis. Each pocket of the first set has a pivotal reverse strut received thereto. A first coupling face of the second pair has a second set of pockets spaced about the rotational axis. Each pocket of the second set has a pivotal forward strut received thereto. A second coupling face of the second pair has a first set of locking formations that are engaged by the forward struts upon projecting outwardly from the second set of pockets to prevent relative rotation of the second outer and inner clutch members with respect to each other in a first direction about the axis while permitting relative rotation of the second outer and inner clutch members with respect to each other in an opposite second direction about the axis by pivoting of the forward struts in the second set of pockets. A second coupling face of the first pair has a second set of locking formations that are engaged by the reverse struts upon projecting outwardly from the first set of pockets to prevent relative rotation of the first outer and inner clutch members with respect to each other in the second direction about the axis while permitting relative rotation of the first outer and inner clutch members with respect to each other in the first direction about the axis by pivoting of the reverse struts in the first set of pockets. The clutch also includes a control member mounted for controlled, shifting movement between the first pair of coupling faces relative to the first set of pockets and operable for controlling position of the reverse struts. The control member allows at least one of the reverse struts to engage at least one of the second set of locking formations in a first position of the control member. The control member maintains the reverse struts in their pockets in a second position of the control member.

Still further in carrying out the above object and other objects of at least one embodiment of the present invention, a clutch is provided which includes first and second outer clutch members and an inner clutch member supported between the outer clutch members for rotation relative to the outer clutch members about a common rotational axis. The first outer and inner clutch members have a first pair of annular coupling faces that oppose each other and are oriented to face axially along the rotational axis. The second outer and the inner clutch members have a second pair of annular coupling faces that oppose each other and are oriented to face axially along the rotational axis. A first coupling face of the first pair has a first set of pockets spaced about the rotational axis. Each pocket of the first set has a pivotal reverse strut received thereby. Each pocket of the first set includes a spring that pivotally biases its strut outwardly therefrom form locking. A first coupling face of the second pair has a second set of pockets spaced about the rotational axis. Each pocket of the second set has a pivotal forward strut received thereby. Each pocket of the second set includes a spring that pivotally biases its strut outwardly therefrom for locking. A second coupling face of the second pair has a first set of locking formations that are engaged by the forward struts upon projecting outwardly from the second set of pockets to prevent relative rotation of the second outer and inner clutch members with respect to each other in a first direction about the axis while permitting relative rotation of the second outer and inner clutch members with respect to each other in an opposite second direction about the axis by pivoting of the forward struts in the second set of pockets. A second coupling face of the first pair has a second set of locking formations that are engaged by the reverse struts upon projecting outwardly from the first set of pockets to prevent relative rotation of the first out and inner clutch members with respect to each other in the second direction about the axis while permitting relative rotation of the first outer and inner clutch members with respect to each other in the first direction about the axis by pivoting of the reverse struts in the first set of pockets.

The above object and other objects, features, and advantages of the present invention are readily apparent from the following detailed description of the best mode for carrying out the invention when taken in connection with the accompanying drawings and in view of the prior art.

DETAILED DESCRIPTION OF THE PREFERRED EMBODIMENT(S)

Figure 1:
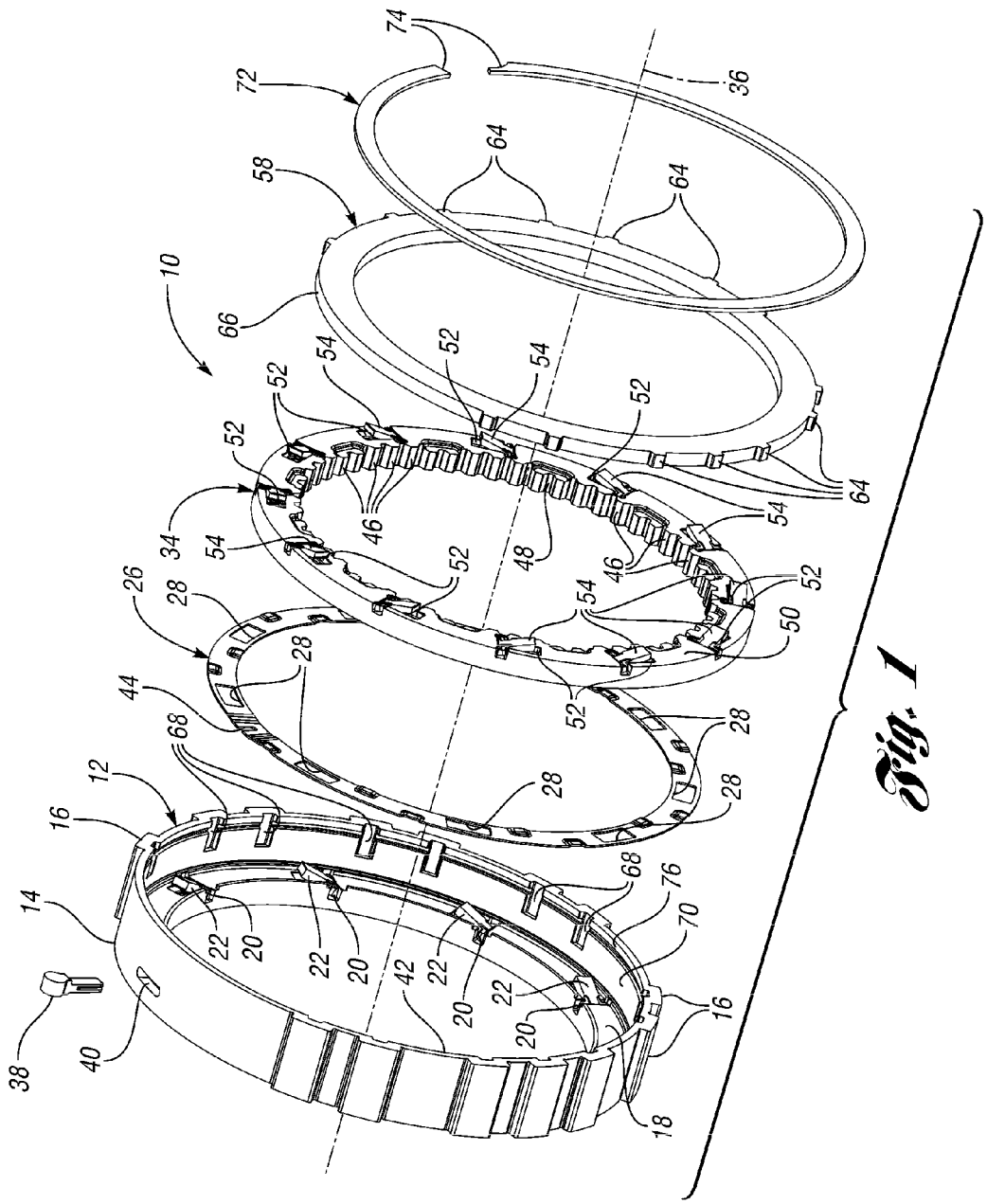
FIG. 1 is an exploded perspective view of a controllable one-way clutch or coupling assembly constructed in accordance with one embodiment of the present invention.
Figure 2:
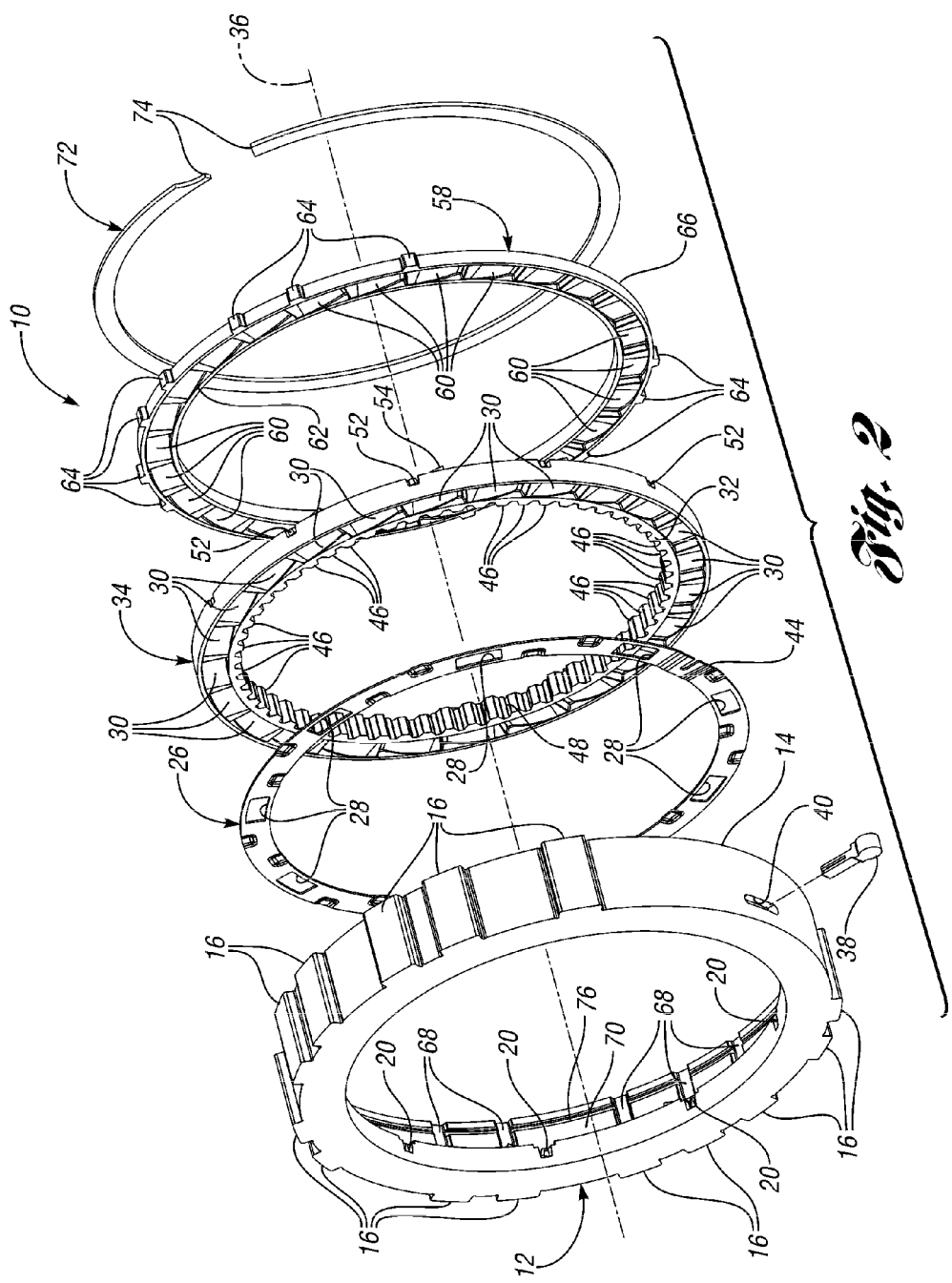
FIG. 2 is a view similar to the view of FIG. 1 but taken from a different direction to illustrate the bottom surfaces of the assembly.
Figure 4:
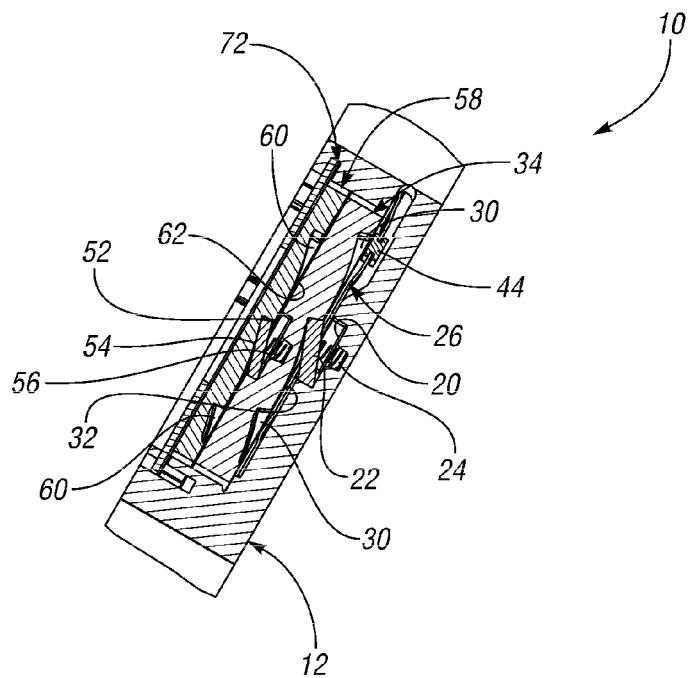
FIG. 4 is a sectional view of the assembly taken along lines 4-4 of FIG. 3.

Referring now to the drawing figures, FIGS. 1 and 2 are exploded perspective views (taken from different directions to illustrate different surfaces of the components of the assembly) of a controllable one-way clutch or coupling assembly, generally indicated at 10, and constructed in accordance with one embodiment of the present invention. The assembly 10 includes an annular reverse pocket plate or first outer coupling member, generally indicated at 12. An outer axially-extending surface 14 of the plate 12 has external splines 16 for coupling the plate 12 to the inner surface of a transmission case (not shown). An inner radially extending surface or coupling face 18 of the plate 12 is formed with spaced pockets 20 in which reverse struts 22 are pivotally biased outwardly by coil springs 24 (not shown in FIG. 1 but shown in FIG. 4 as being disposed in the pockets 20 under their respective struts). Preferably, nine reverse struts 22 are provided. However, it is to be understood that a greater or lesser number of reverse struts may be provided.

The assembly 10 also includes a control member or selector slide plate, generally indicated at 26, having a plurality of spaced apertures 28 extending completely therethrough to allow the reverse struts 22 to pivot in their pockets 20 and extend through the apertures 28 to engage spaced locking formations or ramped reverse notches 30 formed in a radially extending surface or coupling face 32 (FIGS. 2 and 4) of a forward or inner pocket plate or coupling member, generally indicated at 34, when the plate 26 is properly angularly positioned about a common central rotational axis 36 by a shift fork or control element 38 which extends through a notch or slot 40 formed through an outer circumferential end wall 42 of the plate 12. The fork 38 is secured or coupled to the control plate 26 at a location 44 so that movement of the fork 38 in the slot 40 between positions 37 and 39 shown in FIG. 3 cause the plate 26 to slide or shift between its control positions to alternately cover or uncover the struts 22 (i.e., to engage or disengage the reverse struts 22, respectively).

The plate 34 comprises a splined ring having internal splines 46 formed at its inner axially extending surface 48. A radially extending surface 50 or coupling face spaced from the surface 32 of the plate 34 has a plurality of spaced pockets 52 formed therein to receive a plurality of forward struts 54 therein which are pivotally biased by corresponding coil springs 56 (not shown in FIG. 1 but shown in FIG. 4). Preferably, twelve forward struts 54 are provided. However, it is to be understood that a greater or lesser number of forward struts may be provided.

Referring collectively to FIGS. 1 and 2, assembly 10 also includes a second outer coupling member or notch plate, generally indicated at 58, which has a plurality of locking formations, cams or notches 60 formed in a radially extending surface or coupling face 62 thereof by which the forward struts 54 lock the forward plate 34 to the notch plate 58 in one direction about the axis 36 but allow free-wheeling in the opposite direction about the axis 36. The notch plate 58 includes external splines 64 which are formed on an outer axial surface 66 of the plate 58 and which are received and retained within axially extending recesses 68 formed within an inner axially extending surface 70 of the end wall 42 of the plate 12.

The assembly 10 further includes a snap ring, generally indicated at 72, having end portions 74 and which fits within an annular groove 76 formed within the inner surface 70 of the end wall 42 of the plate 12 to hold the plates 12, 26, 34 and 58 together and limit axial movement of the plates relative to one another.

Figure 3:
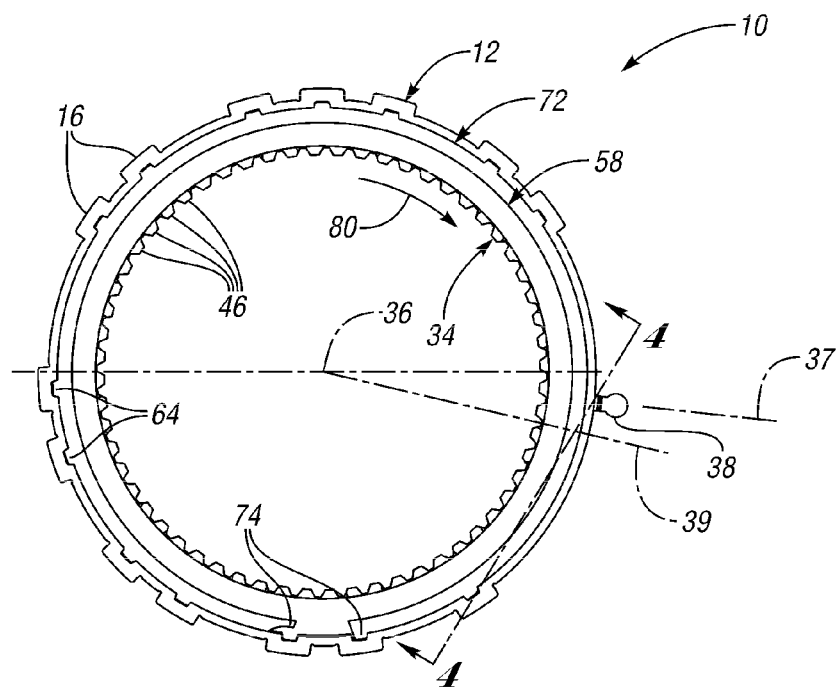
FIG. 3 is a top plan view of the assembly of FIG. 1.

FIG. 3 is a top plan view of the assembly 10 with the shift fork 38 in one control position 37 of its control positions 37 and 39 to disengage the reverse struts 22. The shift fork 38 is rotated about 7° in a forward overrun direction about the axis 36 as indicated by arrow 80 to rotate the selector plate 26 to, in turn, allow the reverse struts 22 to move from their disengaged position in their pockets 20 to their engaged position with the notches 30.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A controllable coupling assembly comprising:

first and second outer coupling members (12, 58) and an inner coupling member (34) supported between the outer coupling members for rotation relative to the outer coupling members about a common rotational axis (36), the first outer and inner coupling members having a first pair of annular coupling faces (18, 32) that oppose each other and are oriented to face axially along the rotational axis, the second outer and the inner coupling members having a second pair of annular coupling faces (50, 62) that oppose each other and are oriented to face axially along the rotational axis;

a first coupling face (18) of the first pair having a first set of pockets (20) spaced about the rotational axis, each pocket of the first set having a pivotal reverse strut (22) received thereby in a disengaged position of the reverse strut;

a first coupling face (50) of the second pair having a second set of pockets (52) spaced about the rotational axis, each pocket of the second set having a pivotal forward strut (54) received thereby in a disengaged position of the forward strut;

a second coupling face (62) of the second pair having a first set of locking formations (30) that are engaged by the forward struts upon projecting outwardly from the second set of pockets in engaged positions of the forward struts to prevent relative rotation of the second outer and inner coupling members with respect to each other in a first direction about the axis while permitting relative rotation of the second outer and inner coupling members with respect to each other in an opposite second direction about the axis by pivoting of the forward struts in the second set of pockets;

a second coupling face (32) of the first pair having a second set of locking formations (30) that are engaged by the reverse struts upon projecting outwardly from the first set of pockets in engaged positions of the reverse struts to prevent relative rotation of the first outer and inner coupling members with respect to each other in the second direction about the axis while permitting relative rotation of the first outer and inner coupling members with respect to each other in the first direction about the axis by pivoting of the reverse struts in the first set of pockets wherein the inner coupling member (34) has one (52) of the first and second sets of pockets at one of its annular coupling faces (50); and a control member (26) mounted for controlled, shifting movement between the first pair of coupling faces (18, 32) relative to the first set of pockets (20) and operable for controlling position of the reverse struts (22), the control member allowing at least one of the reverse struts to engage at least one of the second set of locking formations (30) in a first position of the control member and wherein the control member maintains the reverse struts in their pockets in a second position of the control member.

2. The assembly as claimed in claim 1, wherein the first outer coupling member comprising a housing having an end wall.

3. The assembly as claimed in claim 1, wherein the inner coupling member comprises a splined ring having a pair of spaced, radially extending surfaces and wherein a first one of the radially extending surfaces is formed with the second set of pockets.

4. The assembly as claimed in claim 1, wherein the control member comprises a slide plate controllably rotatable about the rotational axis between the first and second positions.

5. The assembly as claimed in claim 2, further comprising a control element coupled to the control member and extending through a notch formed through the end wall to controllably shift the control member.

6. The assembly as claimed in claim 1, wherein the first set of locking formations comprise cams.

7. The assembly as claimed in claim 1, wherein one of the outer coupling members has an annular groove and wherein the assembly further comprises:

a generally round snap ring that is received by the annular groove in the one outer coupling member to retain the outer members and the inner member together and prevent axial movement of the outer members and the inner member relative to one another.

8. The assembly as claimed in claim 1, wherein the second set of locking formations comprise ramped reverse notches.

9. The assembly as claimed in claim 3, wherein a second one of the radially extending surfaces is formed with the second set of locking formations.

10. A controllable clutch comprising:

first and second outer clutch members and an inner clutch member supported between the outer clutch members for rotation relative to the outer clutch members about a common rotational axis, the first outer and inner clutch members having a first pair of annular coupling faces that oppose each other and are oriented to face axially along the rotational axis, the second outer and inner clutch members having a second pair of annular coupling faces that oppose each other and are oriented to face axially along the rotational axis;

a first coupling face of the first pair having a first set of pockets spaced about the rotational axis, each pocket of the first set having a pivotal reverse strut received thereby in a disengaged position of the reverse strut;

a first coupling face of the second pair having a second set of pockets spaced about the rotational axis, each pocket of the second set having a pivotal forward strut received thereby in a disengaged position of the forward strut;

a second coupling face of the second pair having a first set of locking formations that are engaged by the forward struts upon projecting outwardly from the second set of pockets in engaged positions of the forward struts to prevent relative rotation of the second outer and inner clutch members with respect to each other in a first direction about the axis while permitting relative rotation of the second outer and inner clutch members with respect to each other in an opposite second direction about the axis by pivoting of the forward struts in the second set of pockets;

a second coupling face of the first pair having a second set of locking formations that are engaged by the reverse struts upon projecting outwardly from the first set of pockets in engaged positions of the reverse struts to prevent relative rotation of the first outer and inner clutch members with respect to each other in the second direction about the axis while permitting relative rotation of the first outer and inner clutch members with respect to each other in the first direction about the axis by pivoting of the reverse struts in the first set of pockets wherein the inner coupling member has one of the first and second sets of pockets at one of its annular coupling faces; and a control member mounted for controlled, shifting movement between the first pair of coupling faces relative to the first set of pockets and operable for controlling position of the reverse struts, the control member allowing at least one of the reverse struts to engage at least one of the second set of locking formations in a first position of the control member and wherein the control member maintains the reverse struts in their pockets in a second position of the control member.

11. A clutch comprising:

first and second outer clutch members and an inner clutch member supported between the outer clutch members for rotation relative to the outer clutch members about a common rotational axis, the first outer and inner clutch members having a first pair of annular coupling faces that oppose each other and are oriented to face axially along the rotational axis, the second outer and the inner clutch members having a second pair of annular coupling faces that oppose each other and are oriented to face axially along the rotational axis;

a first coupling face of the first pair having a first set of pockets spaced about the rotational axis, each pocket of the first set having a pivotal reverse strut received thereby in a disengaged position of the reverse strut, and each pocket of the first set including a spring that pivotally biases its strut outwardly therefrom for locking;

a first coupling face of the second pair having a second set of pockets spaced about the rotational axis, each pocket of the second set having a pivotal forward strut received thereby in a disengaged position of the forward strut, and each pocket of the second set including a spring that pivotally biases its strut outwardly therefrom for locking;

a second coupling face of the second pair having a first set of locking formations that are engaged by the forward struts upon projecting outwardly from the second set of pockets in engaged positions of the forward strut to prevent relative rotation of the second outer and inner clutch members with respect to each other in a first direction about the axis while permitting relative rotation of the second outer and inner clutch members with respect to each other in an opposite second direction about the axis by pivoting of the forward struts in the second set of pockets; and a second coupling face of the first pair having a second set of locking formations that are engaged by the reverse struts upon projecting outwardly from the first set of pockets in engaged positions of the reverse struts to prevent relative rotation of the first outer and inner clutch members with respect to each other in the second direction about the axis while permitting relative rotation of the first outer and inner clutch members with respect to each other in the first direction about the axis by pivoting of the reverse struts in the first set of pockets wherein the inner coupling member has one of the first and second sets of pockets at one of its annular coupling faces.

* * * * *